(12) United States Patent
Ren et al.

(10) Patent No.: US 9,210,470 B2
(45) Date of Patent: Dec. 8, 2015

(54) USER CENSORING OF CONTENT DELIVERY SERVICE STREAMING MEDIA

(71) Applicant: Verizon Patent and Licensing, Inc., Basking Ridge, NJ (US)

(72) Inventors: Dahai Ren, Lincoln, MA (US); Ming Chen, Bedford, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 13/790,532

(22) Filed: Mar. 8, 2013

(65) Prior Publication Data

US 2014/0259046 A1 Sep. 11, 2014

(51) Int. Cl.
  *H04N 7/16* (2011.01)
  *H04N 21/454* (2011.01)
  *H04N 21/47* (2011.01)
  *H04N 21/854* (2011.01)

(52) U.S. Cl.
  CPC ........... *H04N 21/4542* (2013.01); *H04N 21/47* (2013.01); *H04N 21/854* (2013.01)

(58) Field of Classification Search
  USPC .................................................... 725/25, 28
  See application file for complete search history.

(56) References Cited

U.S. PATENT DOCUMENTS

| | | | | |
|---|---|---|---|---|
| 6,615,039 B1* | 9/2003 | Eldering | ................ | H04N 7/165 348/E7.063 |
| 8,166,026 B1* | 4/2012 | Sadler | ............... | G06F 17/30867 707/722 |
| 2009/0080852 A1* | 3/2009 | Peters | ............................. | 386/52 |
| 2009/0222849 A1* | 9/2009 | Peters | ................ | H04N 21/4147 725/28 |
| 2013/0204936 A1* | 8/2013 | El Khayat | ............. | H04L 67/104 709/204 |

* cited by examiner

*Primary Examiner* — Pinkal R Chokshi
*Assistant Examiner* — Alexander Gee

(57) ABSTRACT

A client device receives streaming first media from a content delivery network (CDN). The client device executes a media player to play the streaming first media, and receives a first input from a user of the client device that marks a first censoring start time and a first censoring stop time associated with a first portion of the first media that the user wishes to censor. The client device further receives a second input from the user that includes a reason that justifies censoring the first portion of the first media, and stores the first censoring start time and the first censoring stop time in association with data corresponding to the second input from the user in a cut profile for the first media. The client device sends the cut profile for the first media to a content management server in the CDN.

19 Claims, 17 Drawing Sheets

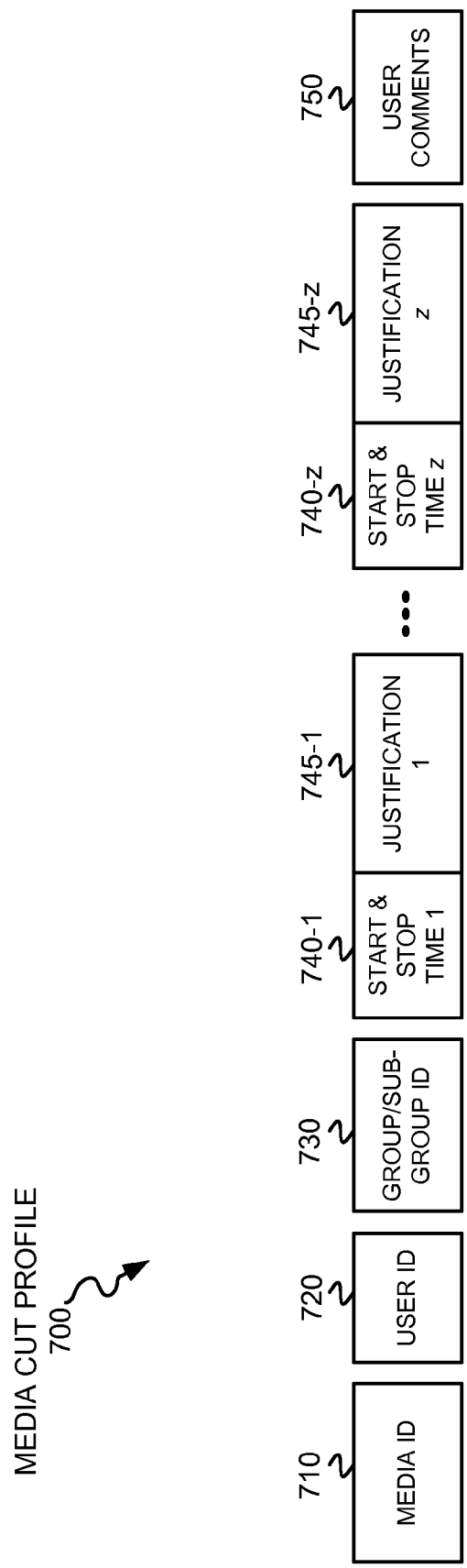

USER CENSORING OF CONTENT DELIVERY SERVICE STREAMING MEDIA

BACKGROUND

Films are rated by authorized agencies or associations in terms of violence, sexuality, drug abuse, and other content. Ratings are used to determine the suitability of films among different age groups. For example, the Motion Picture Association of American (MPAA) is an American agency representing Hollywood studios. The primary MPAA ratings are: G (General audiences), PG (Parental guidance suggested/some material might not be suitable for children), PG-13 (Parents strongly cautioned/some material may be inappropriate for children under the age of 13), R (Restricted/under 17 not admitted without parent or adult guardian), and NC-17 (No one 17 and under admitted). Rating agencies exist in other countries also. It is often difficult to compare ratings between two countries because the ratings often reflect the subjective opinions of the board members of the rating agency. It is further difficult to compare ratings between two countries because the criteria adapted to determine the rating can vary widely between two different film rating systems. For example, violence is less a concern than sexual content in the United States, however, it is the opposite in many European countries. It is also difficult to compare ratings between two countries because the hierarchy of rating classifications also varies from country to country. For example, Belgium has only three classifications for movies, whereas Singapore has seven classifications and Britain has eight classifications.

Existing streaming movie providers allow parents to set parental controls from either the client or the server end. In an example of parental controls at the server end, parents can log on to a streaming on-line account and set the parental control level as PG so that any movie ranked above PG will be blocked from streaming from the server directly. In an example of parental controls at the client end, parents can create a client parental control password and set the parental control level at the client so that any movie ranked above PG will be grayed out by the client even though they are provided by the server. These existing mechanisms of parental control, however, sometime fail due to: 1) a movie with inappropriate content not being appropriately blocked and then being accessed by a young viewer; or 2) a movie without inappropriate content being blocked and not being able to be accessed by a young viewer.

BRIEF DESCRIPTION OF THE DRAWINGS

FIG. 7 depicts an exemplary implementation of a media cut profile associated with a given media;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein permit individualized parental control of media content, including media content delivered by a media delivery service. A media player implemented at a client device, as described herein, includes functionality that allows a user (e.g., a parent) to playback selected items of the media content, and designate, using an interface of the media player, portions of the media content to censor. During playback, the user may select, using the media player, censoring start and stop times along the timeline of the media content that define when censoring of the media content begins and when it ends. In addition to selecting the censoring start and stop times, the user may enter a reason that justifies censoring the portion of the media content. The censoring start and stop times, and the reason justifying the censoring, may be stored in a media cut profile that the user's client device may send to a remote content management server for storage in a media library in association with the uncensored media. The media cut profile may subsequently be used to censor the media content that is accessed and retrieved (e.g., by other users) from the media library.

Figure 1A:
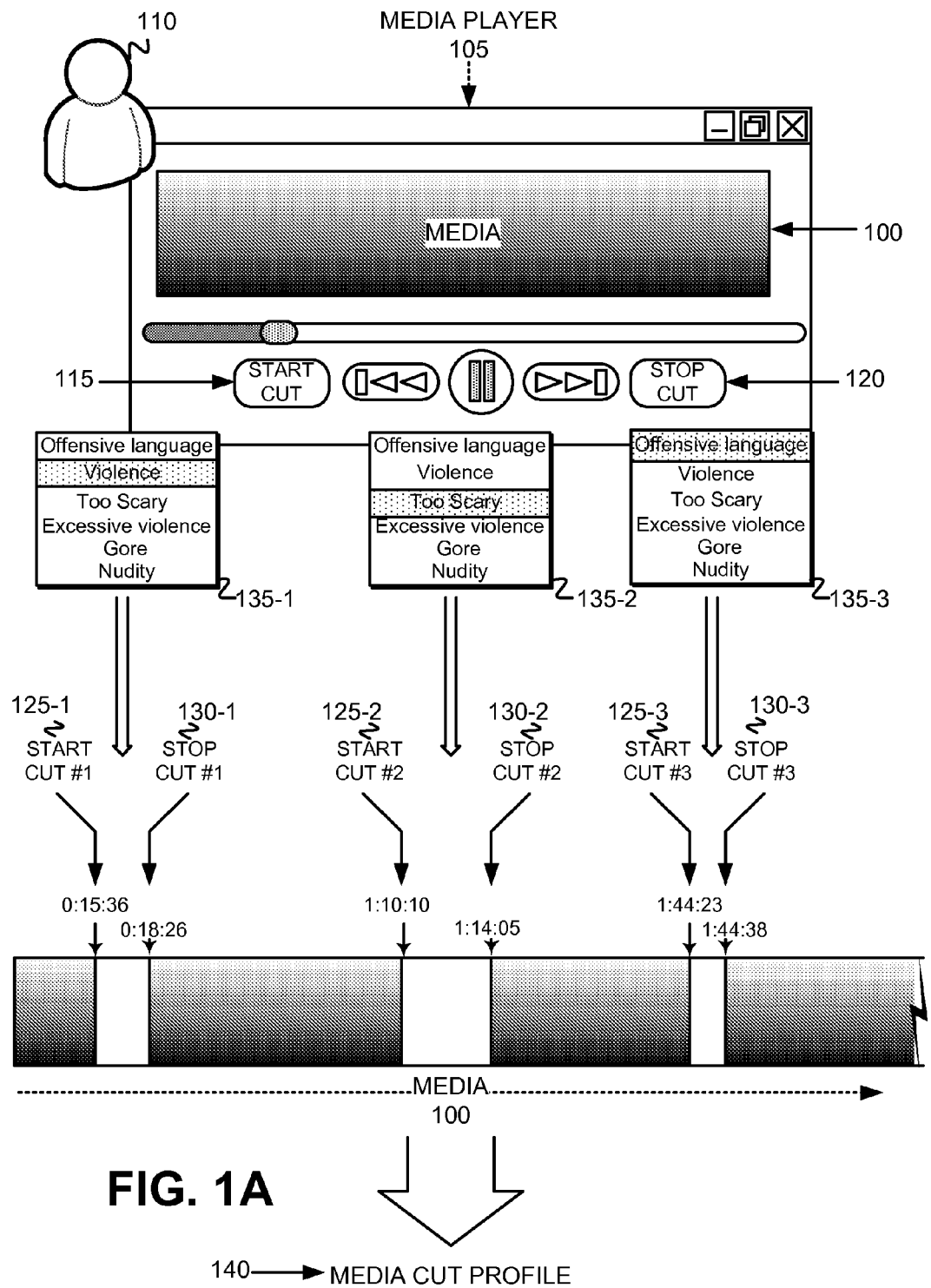
FIGS. 1A and 1B illustrate an overview of the censoring of streaming media at a media player by a user of the media player for future delivery and playback from a content delivery network.
Figure 1B:
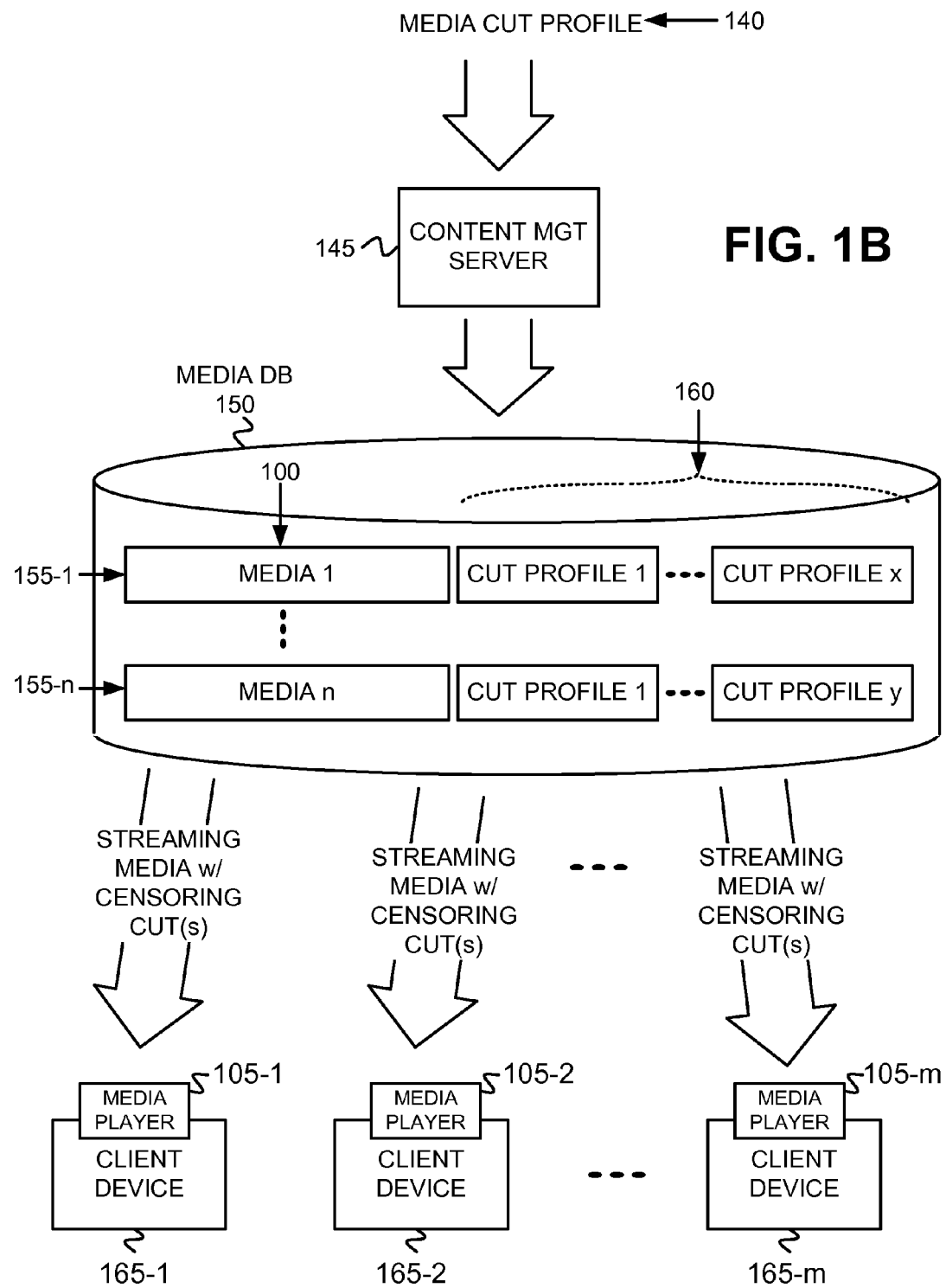

FIGS. 1A and 1B illustrate an overview of the censoring of media 100 at a media player 105 by a user 110 for future delivery and playback from a content delivery network (not shown). Media 100 may include audio media only, video media only, or audio and video media combined. User 110 may access media 100 via streaming of the media from the content delivery network for playback on media player 105. The content delivery network may stream the media to a client device (not shown) implementing media player 105 via, for example, Hypertext Transfer Protocol (HTTP) Live Streaming (HLS). Other media streaming protocols may, however, be used.

During playback, and based on user 110's subjective opinion of media 100 currently being played by media player 105, user 110 may select censoring start and censoring stop times via start cut button 115 and stop cut button 120 of media player 105. Selection of censoring start cut button 115 identifies when censoring begins, and selection of censoring stop cut button 120 identifies when censoring ends, during the media playback. For example, FIG. 1A depicts media 100 being censored at three separate locations along the timeline of media 100. At a time reference of 0:15:36, user 110 selects start cut button 115 to identify a start cut 125-1 at that time. At a time reference of 0:18:26, user 110 selects stop cut button 120 to identify a stop cut 130-1 at that time. The period of time between start cut 125-1 and stop cut 130-1 represents a period of playback time of media 100 that user 110 wishes to censor from media 100.

At a time reference of 1:10:10, user 110 selects start cut button 115 to identify a start cut 125-2 at that time. At a time reference of 1:14:05, user 110 selects stop cut button 120 to identify a stop cut 130-2 at that time. The period of time between start cut 125-2 and stop cut 130-2 represents another period of playback time of media 100 that user 110 wishes to censor from media 100. At a time reference of 1:44:23, user 110 selects start cut button 115 to identify a start cut 125-3 at that time. At a time reference of 1:44:38, user 110 selects stop cut button 120 to identify a stop cut 130-3 at that time. The period of time between start cut 125-3 and stop cut 130-3 represents a period of additional content that user 100 wishes to censor from media 100.

In addition to selecting time periods of content to censor from media 100, user 110 may enter a justification for censoring each cut portion of media 100. The justification may include, for example, reasons such as violence, excessive violence, gore, nudity, explicit language, offensive language, sexual situations, excessively scary or frightening, etc. In one implementation, upon selection of stop cut button 120 on media player 105, a graphical user interface (e.g., a text box (not shown)) may be presented in relation to media player 105 that permits user 110 to enter a justification for censoring the portion of content of media 100. In another implementation, shown in FIG. 1A, upon selection of stop cut button 120 on media player 105, a graphical user interface (e.g., a drop down menu) may be presented in relation to media player 105 that includes a list of reasons that user 110 may select from as a justification for censoring the portion of content of media 100. FIG. 1A depicts user 110 selecting "violence" from drop down menu 135-1 as a justification for censoring the period of content between start cut 125-1 and stop cut 130-1. FIG. 1A further depicts user 110 selecting "Too Scary" from drop down menu 135-2 as a justification for censoring the period of content between start cut 125-2 and stop cut 130-2. FIG. 1A additionally depicts user 110 selecting "Offensive language" from drop down menu 135-3 as a justification for censoring the period of content between start cut 125-3 and stop cut 130-3.

In an implementation in which media 100 includes both audio and video content, media player 105 may include functionality (e.g., a button) for selecting either audio, video, or both audio and video, for determining what aspect of the content is censored in the period of media 100 between a censoring start time (i.e., start cut 125) and a censoring stop time (i.e., stop cut 130). For example, user 110 may select "audio only" from media player 105, and the audio only (i.e., the video continues to play without the audio) will be censored during the period between the censoring start time and the censoring stop time. As another example, user 110 may select "video only" from media player 105, and the video only (i.e., the audio continues to play, but the video is blacked out) will be censored during the period between the censoring start time and the censoring stop time. As a further example, user 110 may select "audio and video" from media player 105, and both the audio and video will be censored during the period between the censoring start time and the censoring stop time (e.g., the media playback completely skips this portion of media 100).

When user 110's playback and censoring of media 100 is finished, all of the start cuts 125, and associated stop cuts 130, and the justification associated with each start cut/stop cut pair, may be stored in a media cut profile 140. Media cut profile 140 may additionally identify media 100.

As shown in FIG. 1B, subsequent to the creation of media cut profile 140, a client device (not shown) associated with media player 105 of FIG. 1A sends media cut profile 140 to a content management server 145 in the content delivery network (not shown). Upon receipt of media cut profile 140, content management server 140 may store media cut profile 140 in a media database (DB) 150 that stores multiple data structures 155-1 through 155-n. Each of data structures 155-1 through 155-n may store an original, uncensored version of media 100, and all of multiple cut profiles 160 associated with the corresponding media 100. Content management server 145, through access and retrieval of media 100 and media cut profiles 160 from media DB 150, may stream media, with censoring cuts, to client devices 165-1 through 165-m for playback via respective media players 105-1 through 105-m.

Figure 2:
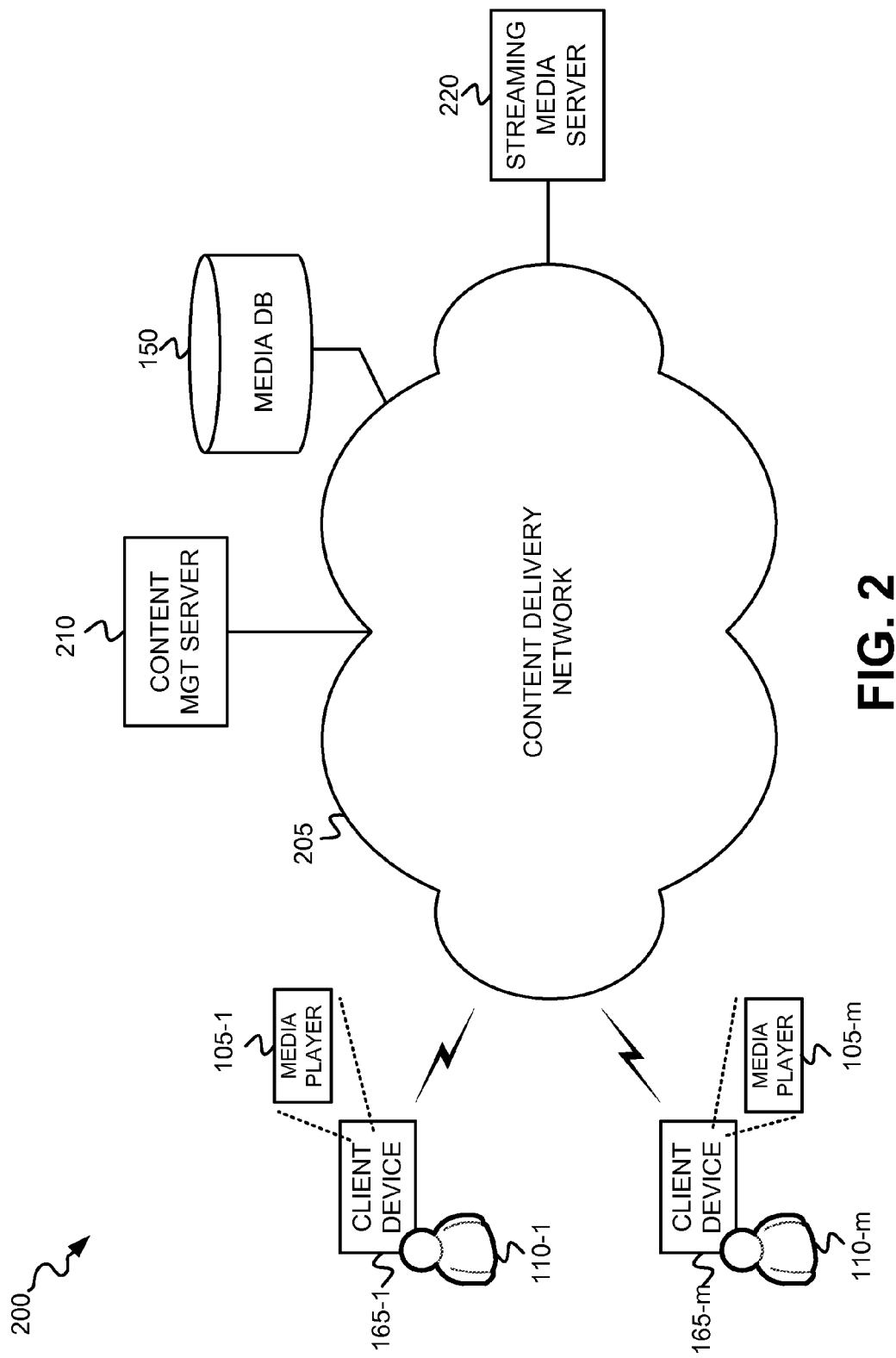
FIG. 2 depicts an exemplary network environment in which user censored media may be stored in a content delivery network for future delivery to client devices.

FIG. 2 depicts an exemplary network environment 200 in which user censored media may be stored in a content delivery network for future delivery to client devices 165-1 through 165-m. Network environment 200 may include a content delivery network (CDN) 205, a content management (mgt) server 210, media DB 150, a streaming media server 220, and client devices 165-1 through 165-m (generically and individually referred to herein as "client device 165" and collectively referred to herein as "client devices 165"). Users 110-1 through 110-m are each associated with a respective one of client devices 165-1 through 165-m. As shown in FIG. 2, each client device 165 may execute a respective one of media players 105-1 through 105-m (generically and individually referred to herein as "media player 105" and collectively referred to herein as "media players 105").

Content delivery network (CDN) 205 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network).

Content management server 210 may include a network device that receives media cut profiles from client devices 165 and stores the media cut profiles in a media library of media DB 150. In some implementations, content management server 210 may censor media based on a received media cut profile associated with the media.

Media DB 150 may include a network device that stores data structures that further store uncensored media and associated media cut profiles. In some implementations, the data structures may additionally store media that have been censored based on the media cut profiles.

Streaming media server 220 may include a network device that retrieves media and streams the media to requesting users at client devices 165. In some implementations, the retrieved media may include uncensored media and, in addition to streaming the media to the client devices 165, streaming media server 220 may send an associated media cut profile which, upon receipt at the requesting user's client device 165, media player 105 may use to censor the media during playback. In other implementations, content management server 210 may censor the media based on the media cut profile and may stream the censored media to the requesting user's client device 165 either directly, or via streaming media server 220.

Client device 165 may include any type of electronic device that may play media (e.g., audio and/or video media) and that may connect with CDN 205 via a wired or wireless connection. Client device 165 may include, for example, a digital media playing device (e.g., a MP3 player), a cellular telephone (e.g., a smart phone), a personal digital assistant (PDA), a computer (e.g., tablet, desktop, palmtop, or laptop), or a set-top box (STB) involved in delivering media via a cable or satellite network to user 110.

The configuration of network components of network environment 200 illustrated in FIG. 2 is for illustrative purposes. Other configurations may be implemented. Therefore, network environment 200 may include additional, fewer and/or different components that may be configured in a different arrangement than those depicted in FIG. 2.

Figure 3:
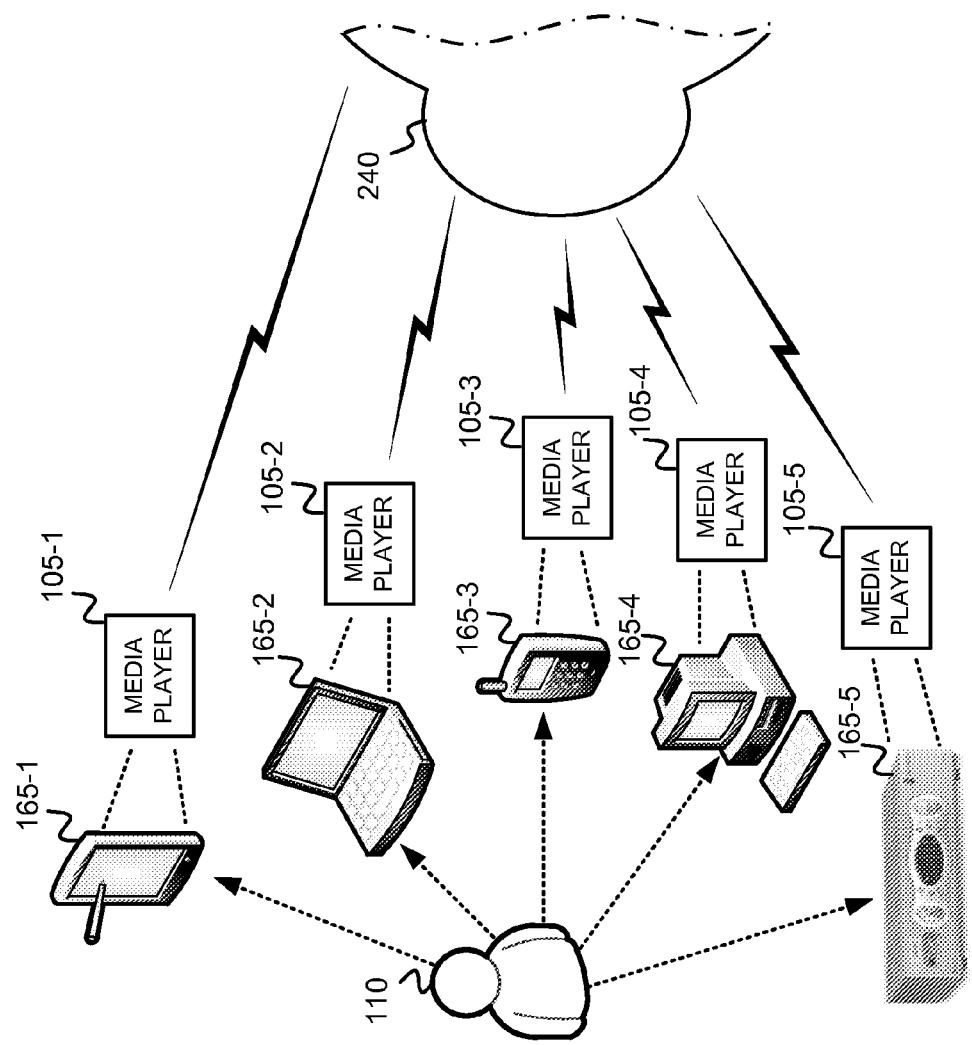
FIG. 3 depicts some specific examples of client devices used in the network environment of FIG. 2.

FIG. 3 depicts some specific examples of client devices 165-1 through 165-5 used in network environment 200. As shown, user 110 may use one or more of multiple different client devices 165-1 through 165-5, where each of the client devices may implement a respective one of media players 105-1 through 105-m for playing streaming media. In the specific examples depicted in FIG. 3, client device 165-1 may include a tablet computer, client device 165-2 may include a laptop computer, client device 165-3 may include a smart phone, client device 165-4 may include a desktop computer, and client device 165-5 may include a set-top box (STB).

Figure 4:
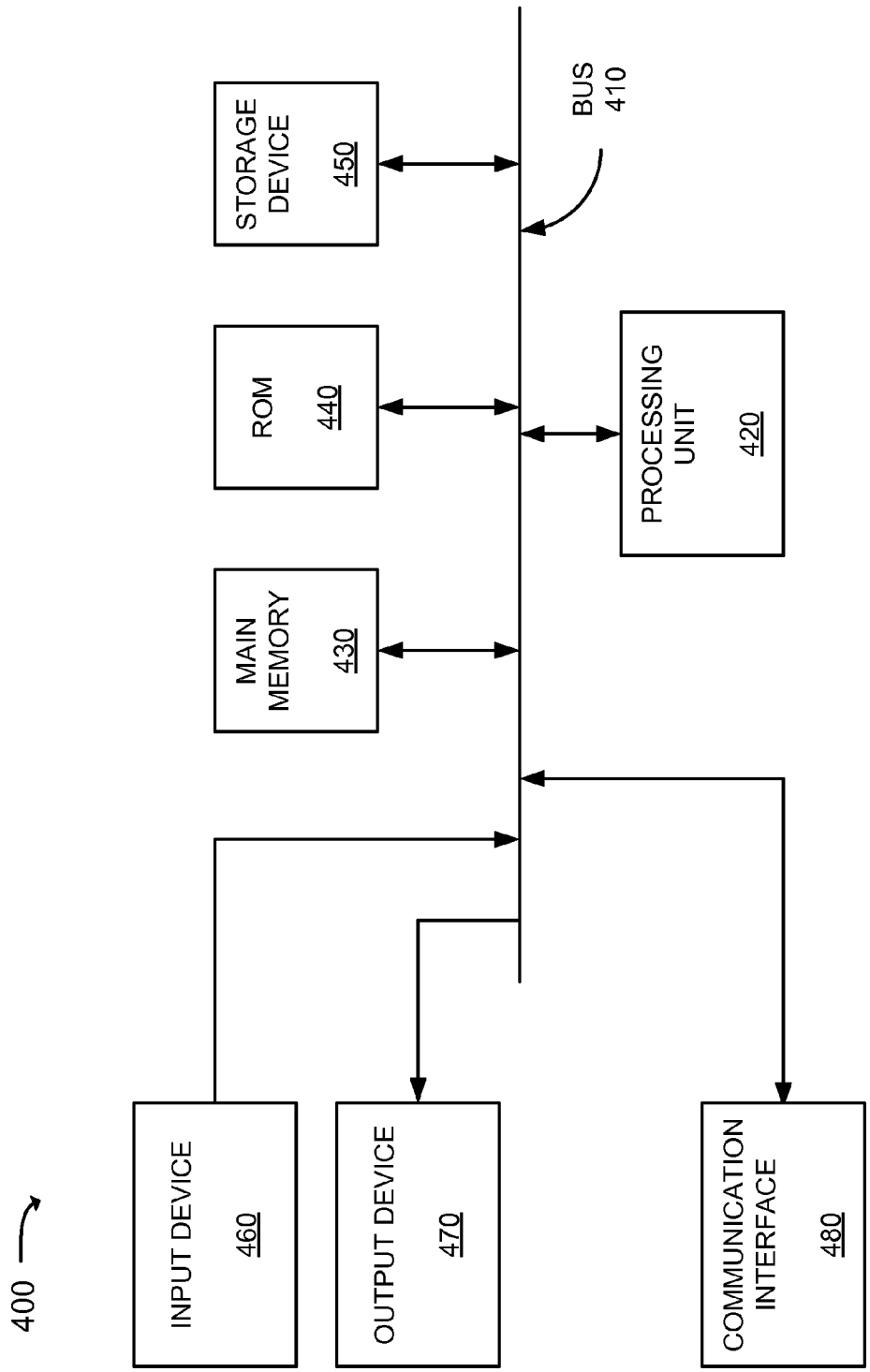
FIG. 4 is a diagram that depicts exemplary components of a device that may correspond to a client device, a content management server, a media database, or a streaming media server of FIG. 2.

FIG. 4 is a diagram that depicts exemplary components of a device 400. Client device 165, content management server 210, media DB 150 and streaming media server 220 may each be configured identical to, or similar to, device 400. Device 400 may include a bus 410, a processing unit 420, a main memory 430, a read only memory (ROM) 440, a storage device 450, an input device 460, an output device 470, and a communication interface 480. Bus 410 may include a path that permits communication among the components of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible, non-transitory computer-readable medium." The processes/methods described herein can be implemented as instructions that are stored in main memory 430, ROM 440 and/or storage device 450 for execution by processing unit 420.

Input device 460 may include one or more mechanisms that permit an operator to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include a transceiver that enables device 400 to communicate with other devices and/or systems. For example, communication interface(s) 480 may include wired or wireless transceivers for communicating via content delivery network 205.

The configuration of components of device 400 illustrated in FIG. 4 is for illustrative purposes. Other configurations may be implemented. Therefore, device 400 may include additional, fewer and/or different components than those depicted in FIG. 4.

Figure 5A:
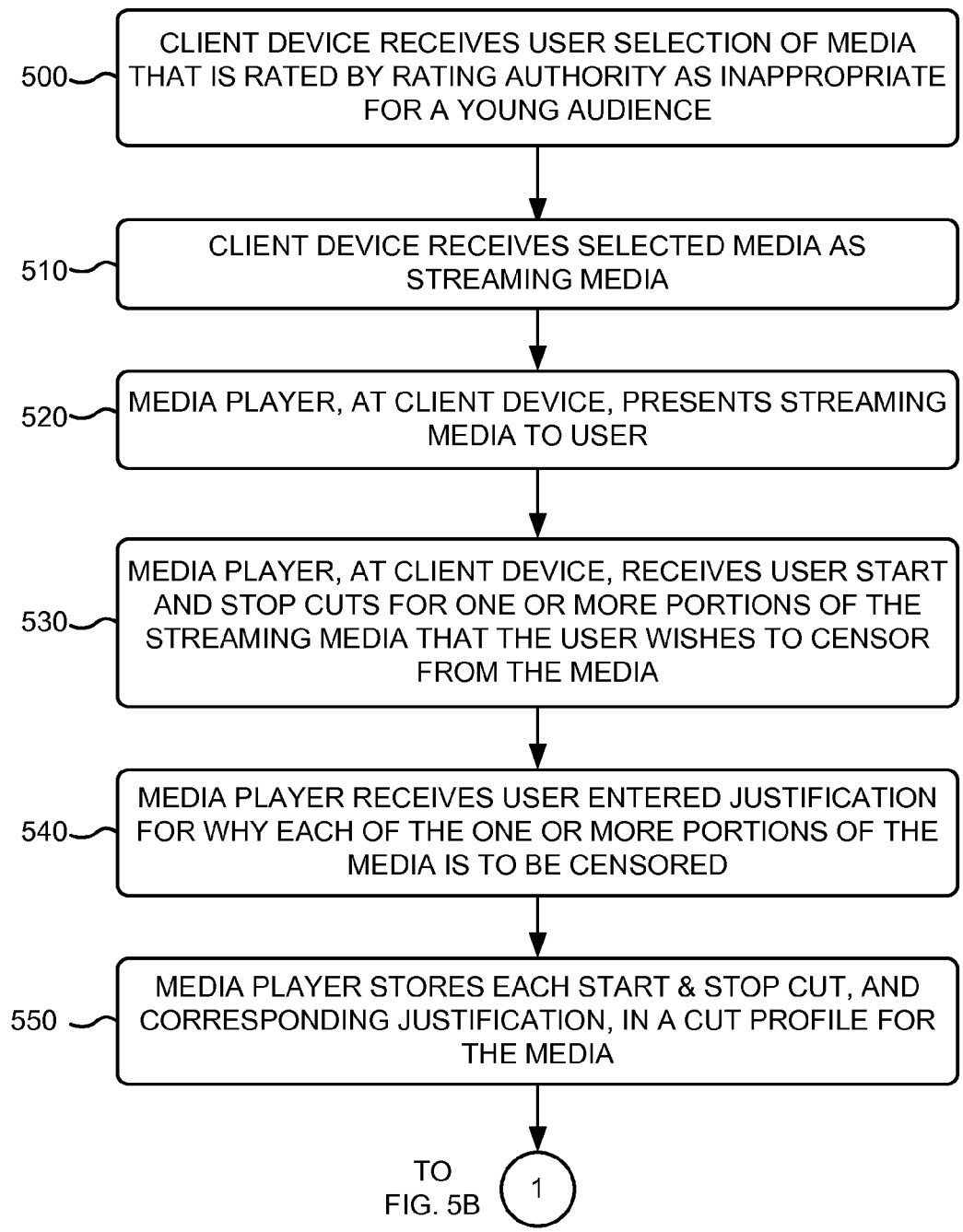
FIGS. 5A and 5B are flow diagrams of a first exemplary process for user-selected censoring of media stored in a content delivery network using a client device's media player.
Figure 5B:
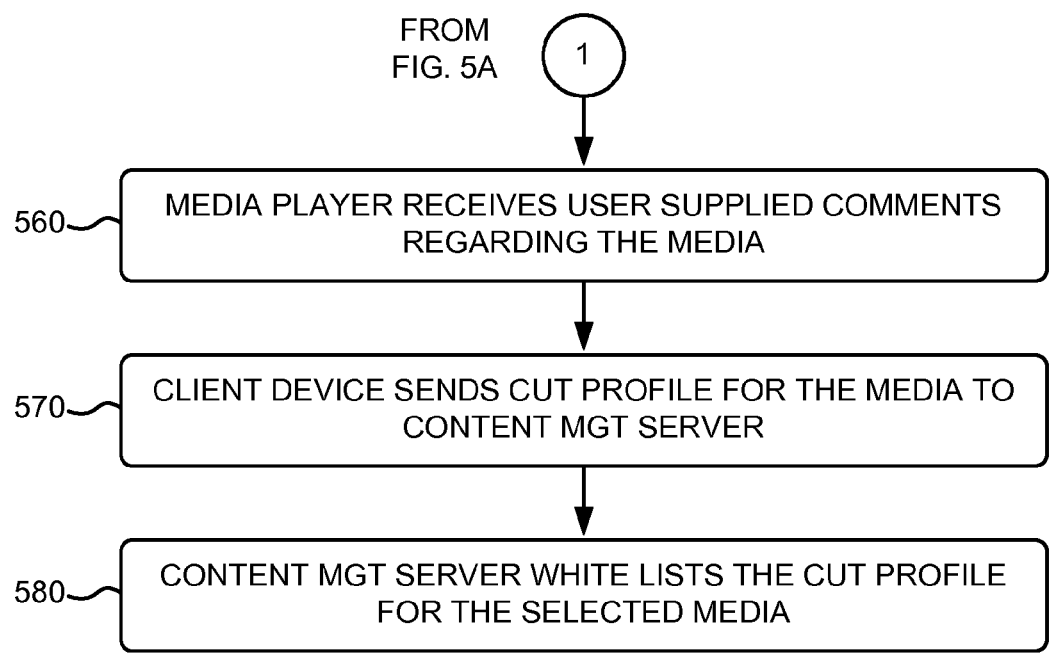

FIGS. 5A and 5B are flow diagrams of a first exemplary process for user-selected censoring of media stored in a content delivery network using a client device's media player. The exemplary process of FIGS. 5A and 5B may be implemented by client device 165, in conjunction with content management server 210. The exemplary process of FIGS. 5A and 5B is described below with reference to the diagrams of FIGS. 2, 6 and 7.

Referring to FIG. 5A, the exemplary process may include client device 165 receiving a user selection of media that is rated by a rating authority as inappropriate for a young audience (block 500). User 110 may, via interaction with streaming media server 220, access and retrieve selected media from a media library stored in media DB 150. The media library may store media that has been previously rated by a rating authority (e.g., the MPAA). Media stored in the media library may include media that is rated as inappropriate for a young audience, such as, for example, media that is rated R or PG-13. Client device 165 may receive the selected media as streaming media (block 510). Upon user selection of the media via interaction with streaming media server 220, streaming media server 220 may retrieve the selected media from media DB 150, and stream the media to client device 165. Streaming media server 220 may stream the selected media to client device 165 using, for example, HLS.

Figure 6:
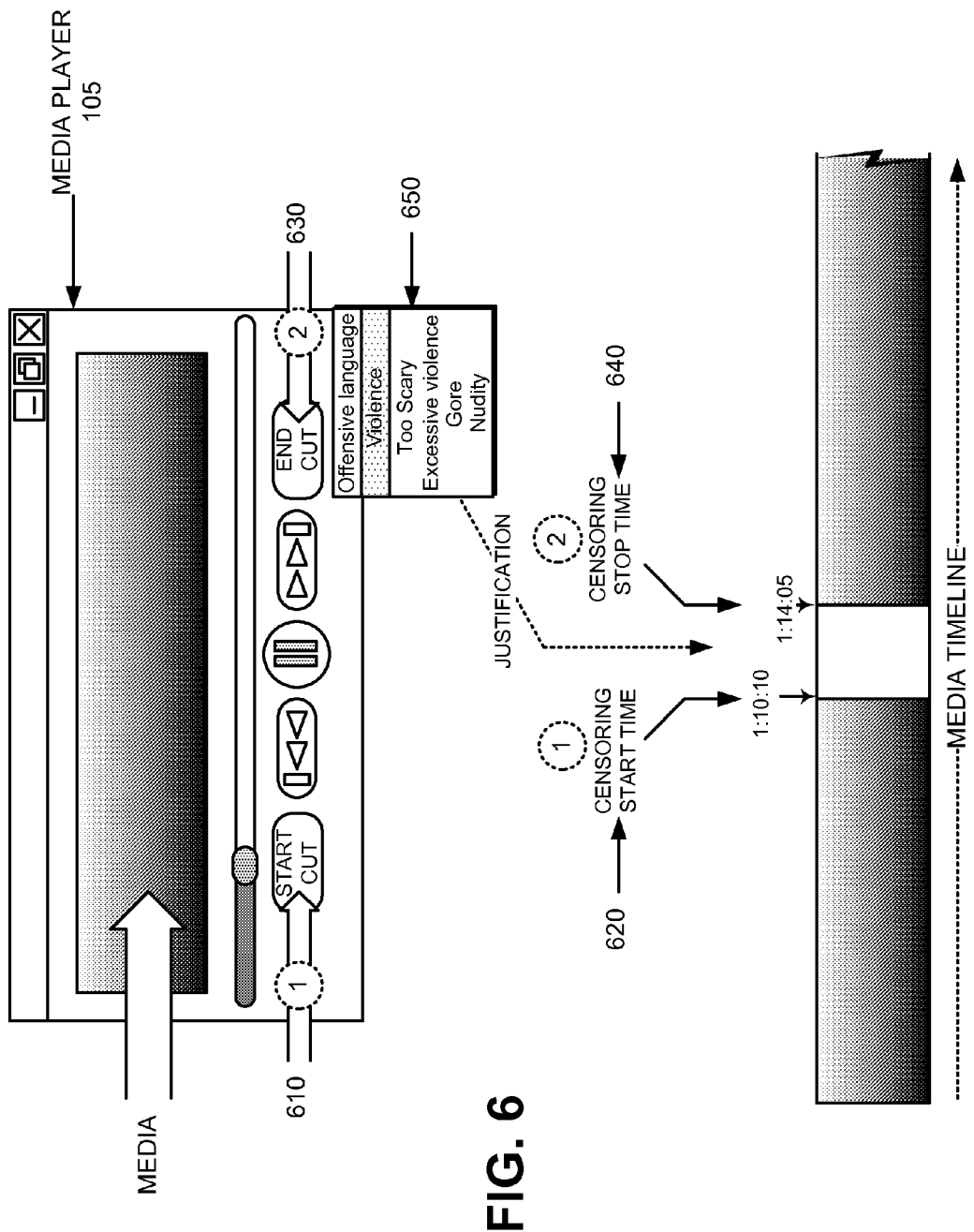
FIG. 6 is a diagram that depicts an example of the user-selected censoring of media of the exemplary process of FIGS. 5A and 5B.

Media player 105, at client device 165, may present the streaming media to user 110 (block 520). FIG. 6 depicts media player 105 displaying media 600 to user 110 (not shown). Media player 105, at client device 165, may receive user start and stop cuts for one or more portions of the streaming media that the user wishes to censor from the media (block 530). During playback of media 600, user 110 may, as shown in FIG. 6, select 610 the "start cut" button to mark a censoring start time 620 along the media timeline of media 600. As playback continues, user 110 may, as also shown in FIG. 6, select 640 the "stop cut" button to mark a censoring stop time 640 along the media timeline of media 600. Media player 105, at client device 165, may receive a user entered justification for why each of the one or more portions of the media is to be censored (block 540). In one implementation, upon selection 640 of the "stop cut" button, as shown in FIG. 6, media player 105's user interface may present a drop down menu 650 that displays multiple different reasons that justify user 110's censoring of media 600 over the portion of media 600 between censoring start time 620 and censoring stop time 640. The reasons presented in drop down menu 650 may include, but are not limited to, explicit language, offensive language, nudity, sexual situations, gore, violence, excessive violence, and being too scary. In another implementation (not shown in FIG. 6), media player 105's user interface may present a dialogue box into which user 110 may enter a reason justifying censoring the portion of media 600 between censoring start time 620 and censoring stop time 640.

Media player 105, at client device 165, may store each start and stop cut, and corresponding justification, in a cut profile for the media (block 550). FIG. 7 depicts an exemplary implementation of a media cut profile 700 for an item of media. As shown, a field that includes a censoring start and stop time 740-1 is stored in media cut profile 700 in association with data that includes a unique identifier 710 for the media, and a unique identifier 720 for user 110 that created media cut profile 700. The unique identifier 720 for user 110 may be, for example, stored at client device 165 and provided in conjunction with the start and stop cut and justification in block 550. In some implementations, media cut profile 700 may additionally store a group or sub-group identifier associated with the user identified by user ID 720. The user identified by user ID 720 may belong to a group or sub-group of users in a community of users (e.g., who have similar interests, or similar values for purposes of media censoring). As shown in FIG. 7, media cut profile 700 may include multiple start and stop times 740-1 through 740-z (where z>1), and corresponding justifications 745-1 through 745-z, for each portion of media 600 to be censored. The number and content of the fields of media cut profile 700, shown in FIG. 7, is for illustrative purposes. Each media cut profile 700 may include additional, fewer and/or different fields than those depicted in FIG. 7.

Referring to FIG. 5B, media player 105, at client device 165, may receive user supplied comments regarding the media (block 560). User 110 may wish to enter their own overall comments related to the content of the media that may be stored in media cut profile 700. For example, user 110 may believe that the media should have been more appropriately rated PG-13, instead of PG, or vice-versa. FIG. 7 depicts user 110's comments stored in field 750 of media cut profile 700.

Client device 165 may send the cut profile for the media to content management server 210 (block 570). Client device 165 may send media cut profile 700 for the media to content management server 210 via CDN 205 as soon as playback, and censoring, of the media by user 110 is completed. Alternatively, client device 165 may send one or more media cut profiles at specific intervals (e.g., twice a day, every hour, etc.) in batches.

Content management server 210 may white list the received cut profile for the selected media (block 580). When storing the selected media in the media library of media DB 150, content management server 210 may "white list" the media by designating it as freely available to the entire community of users of the media content delivery service, or to only a group or sub-group of users of the media content delivery service.

The exemplary process of FIGS. 5A and 5B may be selectively repeated for each selection of media, and censoring of the media, performed by one or more users 110 at a respective client device 165. For example, client device 165 may perform the exemplary process of FIGS. 5A and 5B for multiple different selected items of media. As another example, two different client devices 165 may each perform the exemplary process of FIGS. 5A and 5B for a same selected item of media, or for two different selected items of media.

Figure 8A:
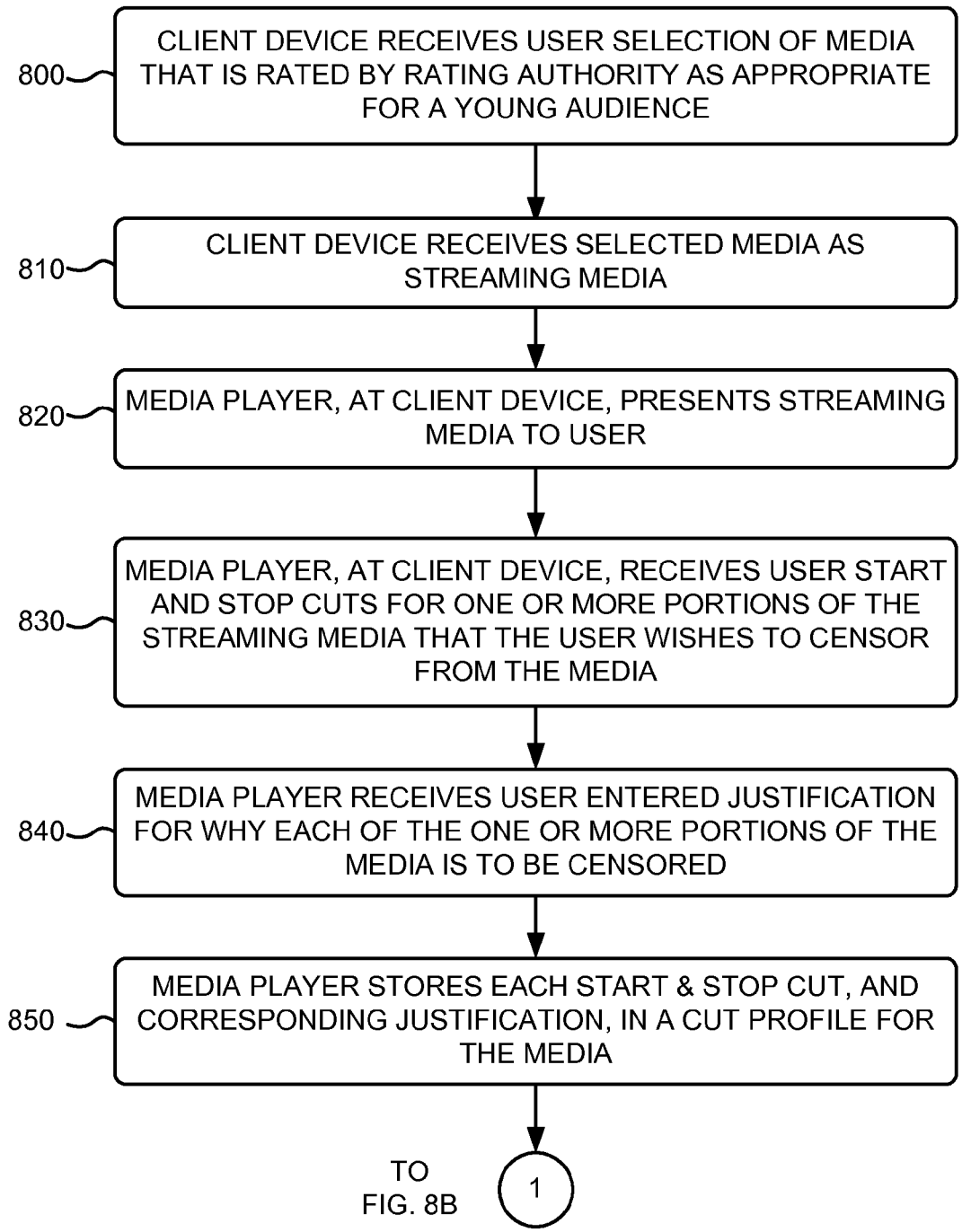
FIGS. 8A and 8B are flow diagrams of a second exemplary process for user-selected censoring of media stored in a content delivery network using a client device's media player.
Figure 8B:
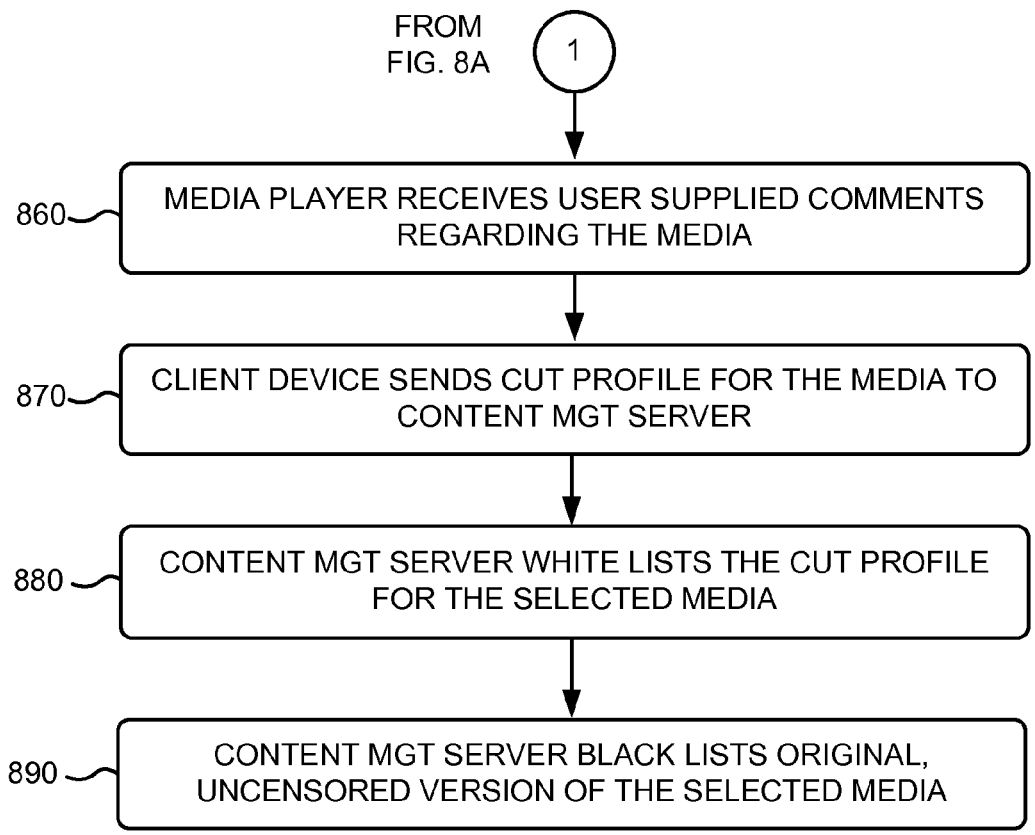

FIGS. 8A and 8B are flow diagrams of a second exemplary process for user-selected censoring of media stored in a content delivery network using a client device's media player. The exemplary process of FIGS. 8A and 8B may be implemented by client device 165, possibly in conjunction with content management server 210. The exemplary process of FIGS. 8A and 8B is described below with reference to the diagrams of FIGS. 2, 6 and 7.

Referring to FIG. 8A, the exemplary process may include client device 165 receiving user selection of media that is rated by a rating authority as appropriate for a young audience (block 800). User 110 may, via interaction with streaming media server 220, access and retrieve selected media from a media library stored in media DB 150. The media library may store media that has been previously rated by a rating authority (e.g., the MPAA). Media stored in the media library may include media that is rated as appropriate for a young audience, such as, for example, media that is rated G or PG-13. Client device 165 may receive the selected media as streaming media (block 810). Upon selection of the media via user interaction with streaming media server 220, streaming media server 220 may retrieve the selected media from media DB 150, and stream the media to client device 165. Streaming media server 220 may stream the selected media to client device 165 using, for example, HLS.

Media player 105, at client device 165, may present the streaming media to user 110 (block 820). FIG. 6 depicts media player 105 displaying media 600 to user 110 (not shown). Media player 105, at client device 165, may receive user start and stop cuts for one or more portions of the streaming media that the user wishes to censor from the media (block 830). During playback of media 600, user 110 may, as shown in FIG. 6, select 610 the "start cut" button to mark a censoring start time 620 along the media timeline of media 600. As playback continues, user 110 may, as also shown in FIG. 6, select 640 the "stop cut" button to mark a censoring stop time 640 along the media timeline of media 600. Media player 105, at client device 165, may receive a user entered justification for why each of the one or more portions of the media is to be censored (block 840). In one implementation, upon selection 640 of the "stop cut" button, as shown in FIG. 6, media player 105's user interface may present a drop down menu 650 that displays multiple different reasons that justify user 110's censoring of media 600 over the portion of media 600 between censoring start time 620 and censoring stop time 640. The reasons presented in drop down menu 650 may include, but are not limited to, explicit language, offensive language, nudity, sexual situations, gore, violence, excessive violence, and being too scary. In another implementation (not shown in FIG. 6), media player 105's user interface may present a dialogue box into which user 110 may enter a reason justifying censoring the portion of media 600 between censoring start time 620 and censoring stop time 640.

Media player 105, at client device 165, may store each start and stop cut, and corresponding justification, in a cut profile for the media (block 850). Media player 105 may store each start and stop cut, and corresponding justification, in media cut profile 700 depicted in FIG. 7, and described above with respect to the exemplary process of FIGS. 5A and 5B. As shown in FIG. 7, media cut profile 700 may store a field that includes a censoring start and stop time 740-1 is stored in media cut profile 700 in association with data that includes a unique identifier 710 for the media, and a unique identifier 720 for user 110. In some implementations, media cut profile 700 may additionally store a group or sub-group identifier associated with the user identified by user ID 720. The user identified by user ID 720 may belong to a group or sub-group of users in a community of users (e.g., who have similar interests, or similar values for purposes of media censoring). As shown in FIG. 7, media cut profile 700 may include multiple start and stop times 740-1 through 740-z (where z>1), and corresponding justifications 745-1 through 745-z, for each portion of media 600 to be censored.

Media player 105, at client device 165, may receive user supplied comments regarding the media (block 860). User 110 may wish to enter their own overall comments related to the content of the media that may be stored in media cut profile 700. For example, user 110 may believe that the media should have been more appropriately rated PG, instead of G. FIG. 7 depicts user 110's comments stored in field 750 of media cut profile 700.

Client device 165 sends the cut profile for the media to content management server 210 (block 870). Client device 165 may send media cut profile 700 for the media to content management server 210 via CDN 205 as soon as playback, and censoring, of the media by user 110 is completed. Alternatively, client device 165 may send one or more media cut profiles at specific intervals (e.g., twice a day, every hour, etc.) in batches.

Content management server 210 may white list the cut profile for the selected media (block 880). When storing the selected media in the media library of media DB 150, content management server 210 may "white list" the media by designating it as freely available to the entire community of users of the media content delivery service, or to only a group or sub-group of users of the media content delivery service. For example, content management server 210 may make the censored version of the media freely available to users who are members of the group or sub-group of users identified in field 730 of media cut profile 700 (i.e., users who are in the same group or sub-group as the user identified in field 720 of media cut profile).

Content management server 210 may black list the original, uncensored version of the selected media (block 890). Content management server 210 may "black list" the media by designating it as not being appropriate for a young audience (contrary to the original rating by the rating authority) and/or prohibiting access to the original, uncensored version of the selected media by either the entire community of users of the media content delivery service, or to only a group or sub-group of users of the media content delivery service. For example, content management server 210 may make the uncensored version of the media unavailable to users who are members of the group or sub-group of users identified in field 730 of media cut profile 700 (i.e., users who are in the same group or sub-group as the user identified in field 720 of media cut profile).

The exemplary process of FIGS. 8A and 8B may be selectively repeated for each selection of media, and censoring of the media, performed by one or more users 110 at a respective client device 165. For example, a client device 165 may perform the exemplary process of FIGS. 8A and 8B for multiple different selected items of media. As another example, two different client devices 165 may each perform the exemplary process of FIGS. 8A and 8B for a same selected item of media, or for two different selected items of media.

Figure 9:
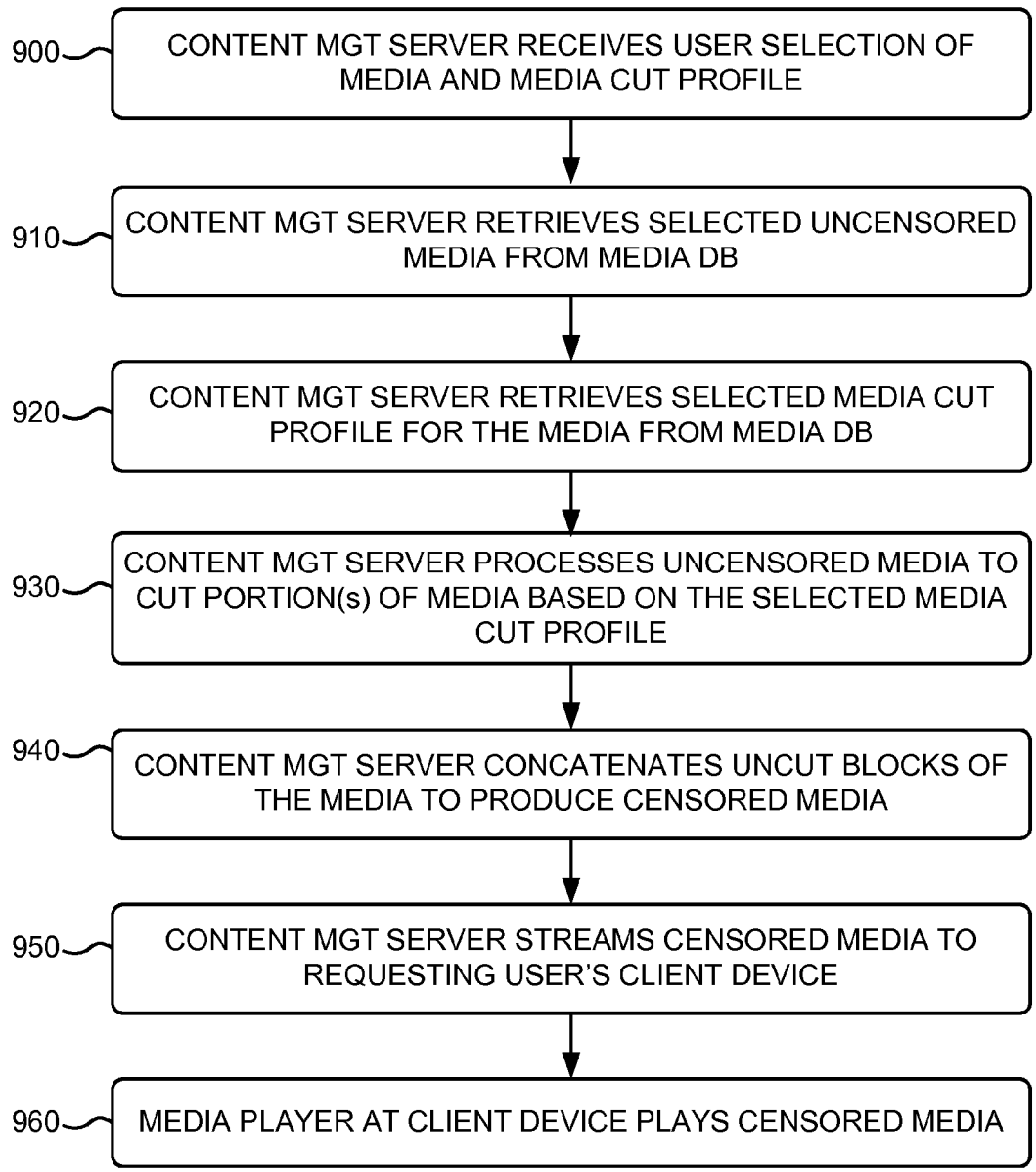
FIG. 9 is a flow diagram of a first exemplary process for user selection of, and censoring of based on a media cut profile, media from a media library in a content delivery network.

FIG. 9 is a flow diagram of a first exemplary process for user selection of, and censoring of based on a media cut profile, media from a media library in a content delivery network. The exemplary process of FIG. 9 may, in one embodiment, be implemented by content management server 210, in conjunction with media DB 150 and/or client device 165. In another embodiment, the exemplary process of FIG. 9 may be implemented by streaming media server 220, in conjunction with content management server 210, media DB 150 and/or client device 165. The exemplary process of FIG. 9 is described below with reference to FIGS. 2 and 10.

Figure 10:
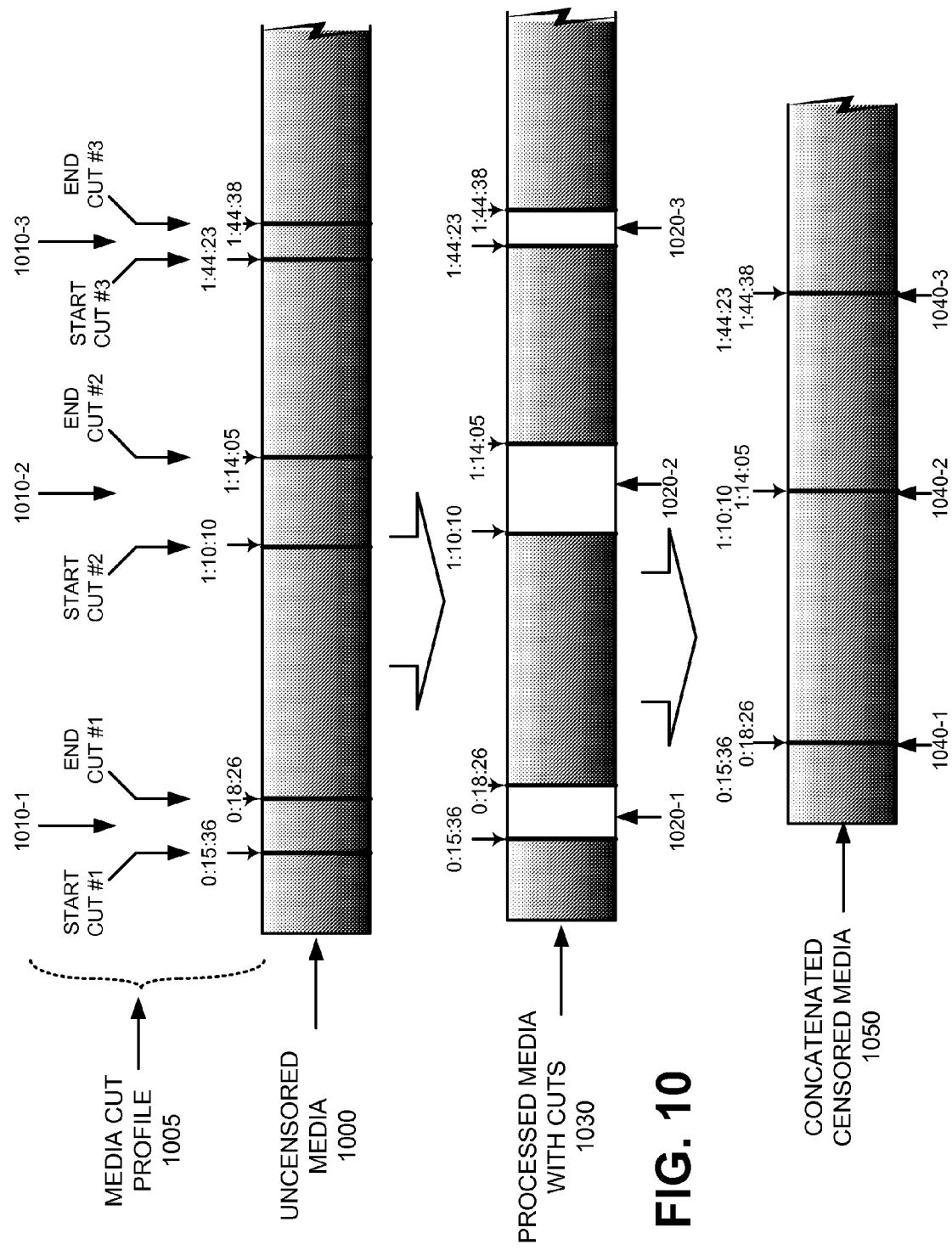
FIG. 10 is a diagram that depicts an example of the censoring of media based on a media cut profile of the exemplary process of FIG. 9.

Referring to FIG. 9, the exemplary process may include content management server 210 receiving a user selection of media and a media cut profile (block 900). User 110 at client device 165 may select media from a media library stored in media DB 150, and a media cut profile associated with the selected media. Each item of media stored in media DB 150 may have one or more media profiles associated with them (as shown in FIG. 1B). Client device 165 may send the selection to either content management server 210 or streaming media server 220. Content management server 210 may retrieve the selected uncensored media from media DB 150 (block 910) and may further retrieve the selected media cut profile for the media from media DB 150 (block 920). FIG. 10 depicts user-selected uncensored media 1000 that has been retrieved from media DB 150, along with a user-selected media cut profile 1005. As shown in FIG. 10, media cut profile 1005 includes multiple different portions of content 1010-1, 1010-2 and 1010-3 to be censored (only three shown for the sake of simplicity), each defined by a censoring start time (start cut) and a censoring stop time (stop cut).

Content management server 210 may process the uncensored media to cut a portion(s) of the media based on the selected media cut profile (block 930). As shown in FIG. 10, content management server 210 may remove the different portions of content 1010-1, 1010-2 and 1010-3 from uncensored media 1000 based on media cut profile 1005 to produce a processed media with censored cuts 1030 that includes censored portions 1020-1, 1020-2 and 1020-3 of media 1000. For example, portion 1010-1 of media 1000 spanning from start time 0:15:36 to stop time 0:18:26 along the timeline of media 1000 is removed, portion 1010-2 of media 1000 spanning from start time 1:10:10 to stop time 1:14:05 along the timeline of media 1000 is removed, and portion 1010-3 of media 1000 spanning from start time 1:44:23 to stop time 1:44:38 along the timeline of media 1000 is removed. Content management server 210 may concatenate uncut blocks of the media to produce a censored version of the selected media (block 940). As shown in FIG. 10, the censored portions 1020-1, 1020-2 and 1020-3 of media 1000 may be removed from processed media 1030 such that the gaps in the timeline of media 1000 created by removal of portions 1010-1, 1010-2 and 1010-3 are eliminated to produce concatenated censored media 1050. For example, as shown in FIG. 10, censored portion 1020-1 is removed from the data of media 1000 such that the censoring start time of 0:15:36 is coincident with the censoring stop time of 0:18:26, leaving no discernible gap in the media from the standpoint of a viewing user.

Content management server 210 may stream the censored media to a requesting user's client device (block 950). In one embodiment, content management server 210 may stream censored media 1050 directly to the requesting user's client device 165. In another embodiment, content management server 210 may supply the censored media 1050 to streaming media server 220 which, in turn, may send censored media 1050 to the requesting user's client device 165. Media player 105, at the requesting user's client device 165, may play the censored media as it is streamed to client device 165 via CDN 205 (block 960).

The exemplary process of FIG. 9 may be repeated for each user selection of media and its associated media cut profile from a media library stored in media DB 150.

Figure 11:
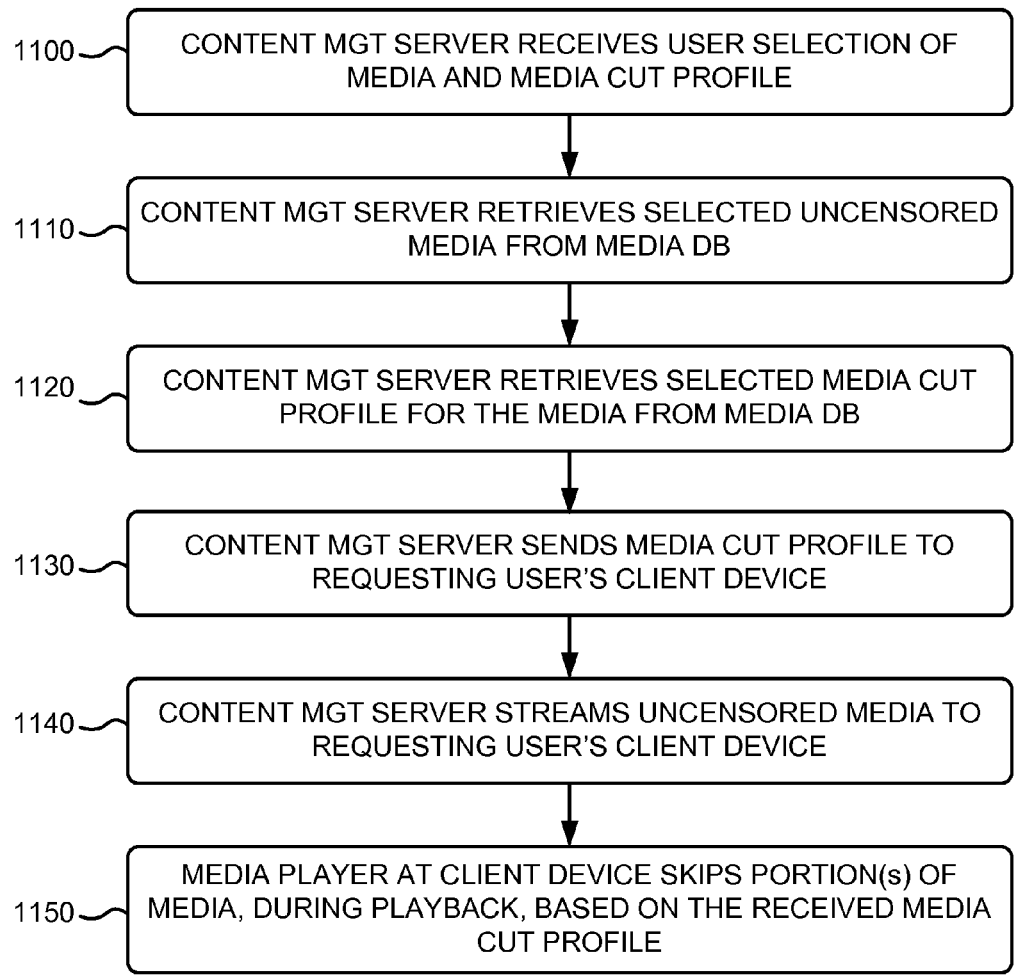
FIG. 11 is a flow diagram of a second exemplary process for user selection of, and censoring of based on a media cut profile, media from a media library in a content delivery network.

FIG. 11 is a flow diagram of a second exemplary process for user selection of, and censoring of based on a media cut profile, media from a media library in a content delivery network. The exemplary process of FIG. 11 may, in one embodiment, be implemented by content management server 210, in conjunction with media DB 150 and/or client device 165. In another embodiment, the exemplary process of FIG. 11 may be implemented by streaming media server 220, in conjunction with content management server 210, media DB 150 and/or client device 165. The exemplary process of FIG. 11 is described below with reference to FIGS. 2 and 12.

The exemplary process may include content management server 210 receiving user selection of media and a media cut profile (block 1100). User 110 at client device 165 may select media from a media library stored in media DB 150, and a media cut profile associated with the selected media. Each item of media stored in media DB 150 may have one or more media profiles associated with them (as shown in FIG. 1B). Client device 165 may send the selection to either content management server 210 or streaming media server 220.

Figure 12:
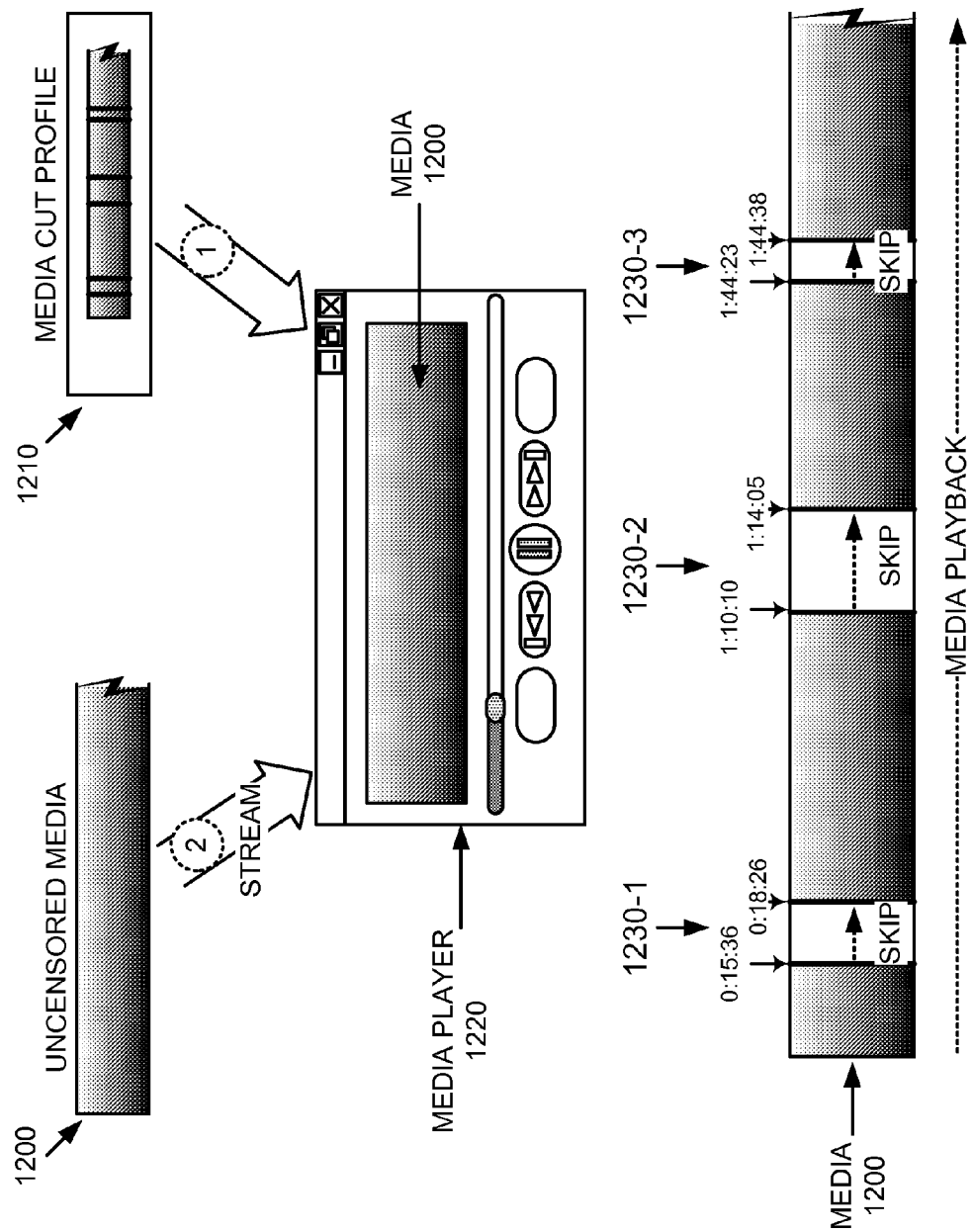
FIG. 12 is a diagram that depicts an example of the censoring of media based on a media cut profile of the exemplary process of FIG. 11.

Content management server 210 may retrieve selected uncensored media from media DB 150 (block 1110) and may retrieve the selected media cut profile for the media from media DB 150 (block 1120). FIG. 12 depicts media 1200, and an associated media cut profile 1210, retrieved from media DB 150 (not shown). Content management server 210 may send the media cut profile to the requesting user's client device 165 (block 1130). FIG. 12 depicts media cut profile 1210 being sent (identified with a "1") to media player 1220 at the requesting user's client device (not shown). Content management server 210 may stream the uncensored media to the requestings user's client device 165 (block 1140). FIG. 12 depicts media 1200 being streamed (identified with a "2") to media player 1220 at the requesting user's client device (not shown).

Media player 105, at the requesting user's client device 165, may skip a portion(s) of media, during playback, based on the received media cut profile (block 1150). As shown in FIG. 12, during playback of media 1200, media player 1220 may skip the playback of each portion 1230-1, 1230-2 and 1230-2 of media 1200 marked with a censoring start time and censoring stop time in media cut profile 1210. For example, during playback of portion 1230-1 of media 1200 marked with a censoring start time of 0:15:36 and a censoring stop time of 0:18:26, media player 1220 instantaneously skips the playback from 0:15:36 to 0:18:26, thus, omitting the first portion of media intended to be censored.

Figure 13:
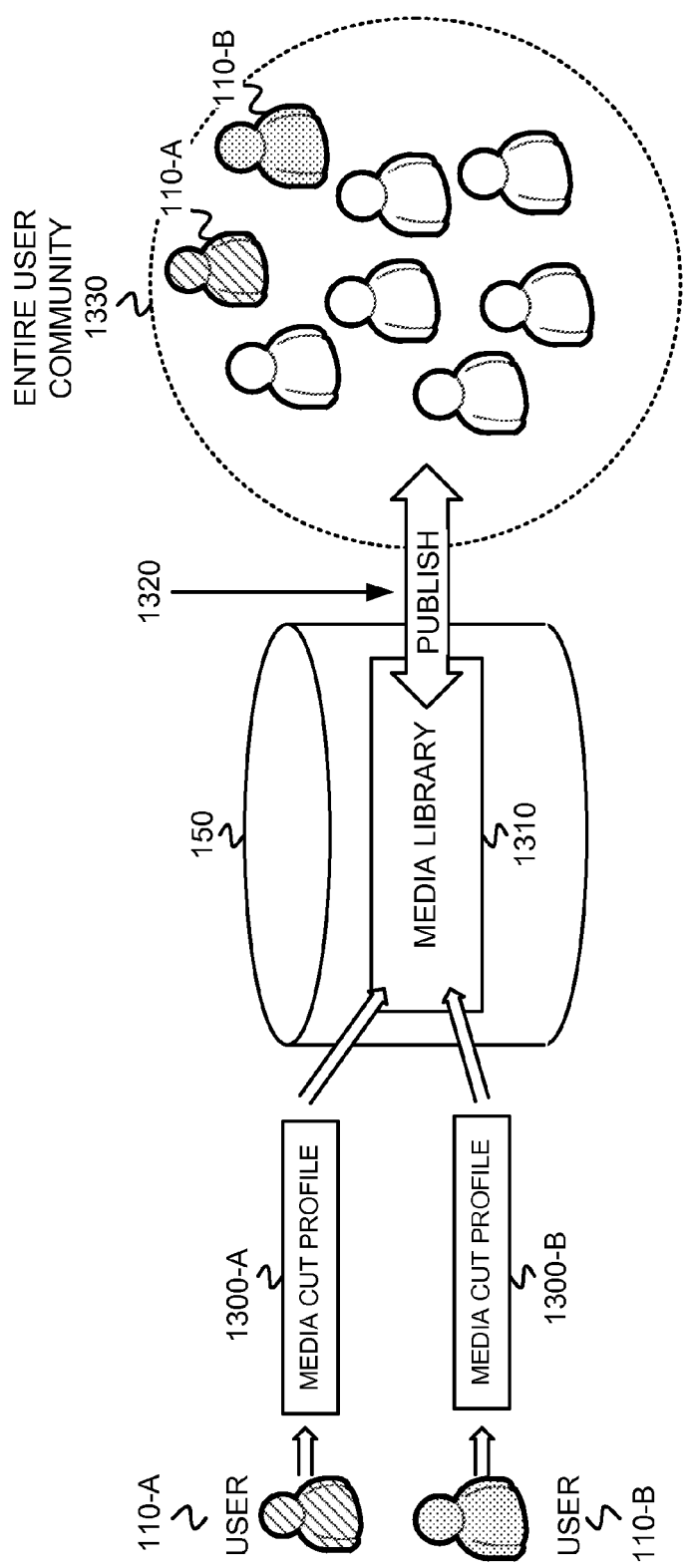
FIG. 13 is a diagram that depicts an example of the publishing of media cut profiles, associated with user censored media, via a media library to a user community.

FIG. 13 is a diagram that depicts an example of the publishing of media cut profiles, associated with user-censored media, via a media library to a community of users. In the example of FIG. 13, media censored by some users of a community of users are published to the entire community of users. For example, as shown in FIG. 13, users 110-A and 110-B censor media, as described above with respect to FIGS. 5A and 5B, or FIGS. 8A and 8B, to generate respective media cut profiles 1300-A and 1300-B. User 110-A and user 110-B send media cut profiles 1300-A and 1300-B to media DB 150 for storage in a media library 1310 that can be accessed by other users.

Media cut profile 1300-A and media cut profile 1300-B may then be published 1320 from media library 1310, either by content management server 210 (not shown) or streaming media server 220 (not shown), to an entire community 1330 of users. Therefore, all of the users in user community 1330 (including user 110-A and user 110-B) may access and retrieve the media cut profiles 1300-A and 1300-B, and the associated items of media, from media library 150 via content management server 210 or streaming media server 220 for playback at respective media players and client devices.

Figure 14:
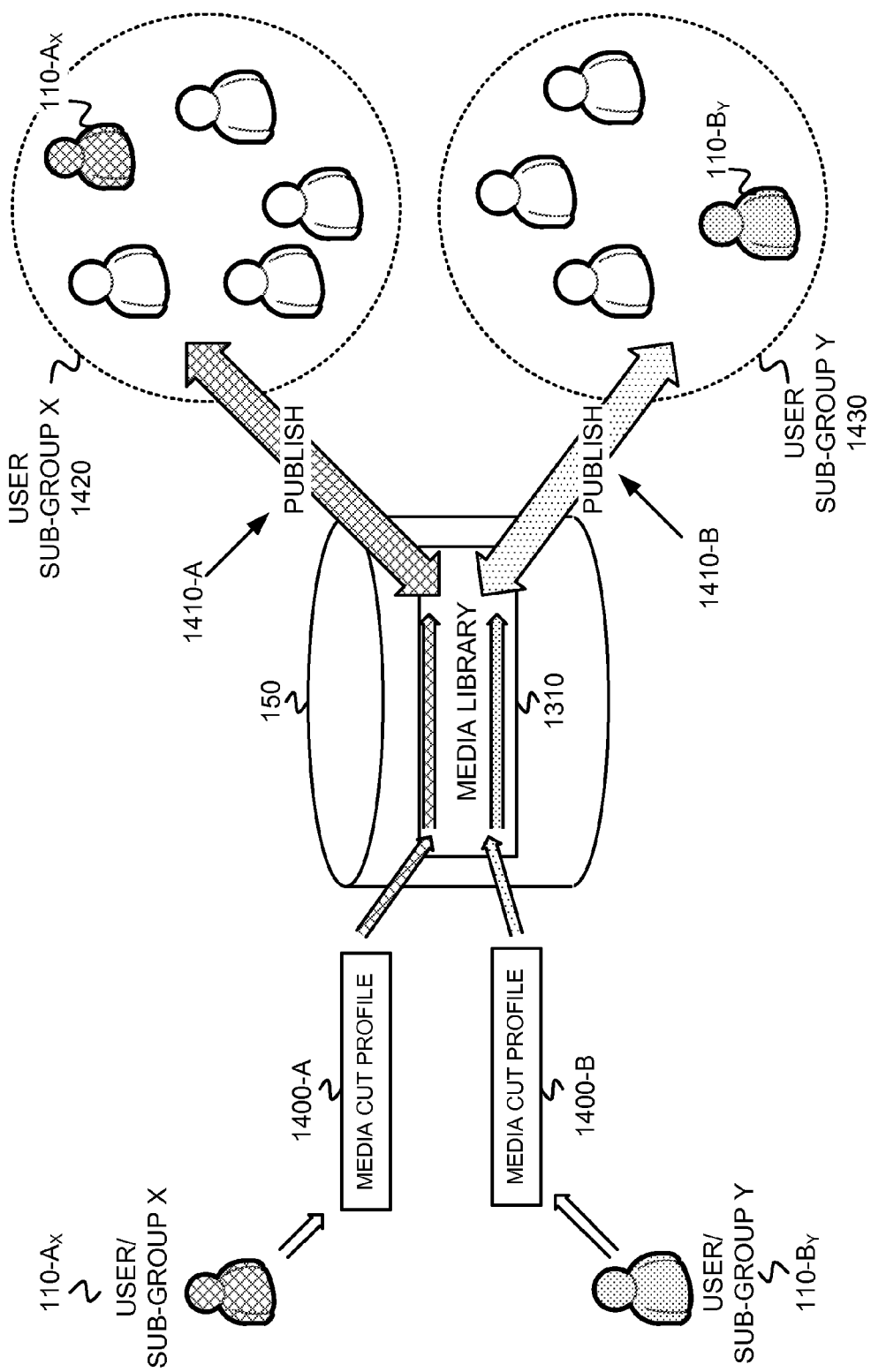
FIG. 14 is a diagram that depicts an example of the publishing of media cut profiles, associated with user censored media, via a media library to subgroups of a user community.

FIG. 14 is a diagram that depicts an example of the publishing of media cut profiles, associated with user censored media, via a media library to subgroups of a community of users. In the example of FIG. 14, users may each belong to one or more sub-groups of a community of users (e.g., a horror move sub-group, a science fiction movie sub-group, etc.), and media censored by those users are published only to the one or more sub-groups to which those users belong. For example, as shown in FIG. 14, user 110-$A_X$ is a member of sub-group X of a community of users, and user 110-$B_Y$ is a member of sub-group Y of a community of users. Users 110-$A_X$ and 110-$B_Y$ censor media, described above with respect to FIGS. 5A and 5B, or FIGS. 8A and 8B, to generate respective media cut profiles 1400-A and 1400-B. Users 110-$A_X$ and 110-$B_Y$ send media cut profiles 1400-A and 1400-B to media DB 150 for storage in a media library 1310 that can be accessed by other users.

Media cut profile 1400-A may then be published 1410-A from media library 1310, either by content management server 210 (not shown) or streaming media server 220 (not shown), to user sub-group X 1420 of the community of users. Media cut profile 1400-B may then be published 1410-B from media library 1410-B, either by content management server 210 or streaming media server 220, to user sub-group Y 1430 of the community of users. Users in sub-group X 1420, including user 110-$A_X$, may access and retrieve media cut profile 1400-A, and the associated media, from media library 1310 via content management server 210 or streaming media server 220 for playback at respective media players and client devices. Users in sub-group Y 1430, including user 110-$B_Y$, may access and retrieve media cut profile 1400-B, and the associated media, from media library 1310 via content management server 210 or streaming media server 220 for playback at respective media players and client devices.

Exemplary embodiments described herein include functionality for individualized censoring of media content that can be accessed and retrieved from a content delivery network via a media delivery service. Parental control of media content may, thus, be customized based on each parent's subjective assessment of the content of the media such that the parent need not rely solely on ratings applied by rating authorities to the media.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A, 5B, 8A, 8B, 9 and 11, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a network device, from a first user of a media delivery service via a first client device, a first media cut profile associated with first media stored in a content delivery network (CDN), wherein the first user is a member of a user group of the media delivery service and belongs to a first media genre subgroup of the user group and a second media genre subgroup of the user group, and wherein the first media cut profile includes:
an identifier associated with the first media,
an identifier associated with the first user,
an identifier associated with the first media genre subgroup, and
at least one first user selected censoring start time and first censoring stop time associated with at least one portion of the first media;
storing the first media cut profile, in association with the first media, in the CDN to be available to each member of the user group via the media delivery service;
publishing, via the media delivery service and based on the identifier associated with the first media genre subgroup, the first media cut profile only to a plurality of user devices associated with members of the user group that belong to the first media genre subgroup;
preventing access, via the media delivery service, to the first media stored in the CDN, by requesting client devices associated with members of the user group that belong to an age subgroup of users;
processing, by the network device, the first media to cut the at least one portion of the first media between the at least one first censoring start time and first censoring stop time to produce multiple uncut blocks of the first media;
concatenating, by the network device, the multiple uncut blocks of the first media to produce first censored media; and
streaming, by the network device in the CDN, the first censored media to a first requesting client device.

2. The method of claim 1, further comprising:
receiving, at the network device, from a second user via a second client device, a second media cut profile associated with second media stored in the CDN, wherein the second media cut profile specifies at least one second user selected censoring start time and second censoring stop time associated with at least one portion of the second media;
processing, by the network device, the second media to cut the at least one portion of the second media between the at least one second censoring start time and second censoring stop time to produce multiple uncut blocks of the second media; and
concatenating, by the network device, the multiple uncut blocks of the second media to produce second censored media; and
streaming, by the network device in the CDN, the second censored media to a second requesting client device.

3. The method of claim 1, wherein the first media cut profile further includes data indicating a reason that justifies censoring of the at least one portion from the first media.

4. The method of claim 3, wherein the first media cut profile further includes first user-supplied comments regarding the first media.

5. A client device, comprising:
a communication interface configured to receive streaming first media from a content delivery network (CDN) via a media delivery service; and
a processing unit configured to:
execute a media player to play the streaming first media,
receive, via an interface of the media player, a first input from a user of the client device that marks a first censoring start time and a first censoring stop time associated with a first portion of the first media, wherein the user is a member of a first user group of the media delivery service and belongs to a first media genre subgroup of the first user group and a second media genre subgroup of the first user group,
receive, via the interface of the media player, a second input from the user that includes a reason that justifies censoring the first portion of the first media,
store, in a cut profile for the first media:
an identifier associated with the first media,
an identifier associated with the user,
an identifier associated with the first media genre subgroup, and
the first censoring start time and the first censoring stop time in association with data corresponding to the second input from the user,
send, via the communication interface, the cut profile for the first media to a content management server in the CDN, to be available to each member of the user group via the media delivery service, and for publication only to a plurality of user devices associated with members of the user group that belong to the first media genre subgroup of users, wherein the content management server prevents access to the first media by requesting client devices associated with members of the user group that belong to an age subgroup of users,
wherein, subsequent to receiving the first input from the user of the client, the processing unit is further configured to:
present a drop down menu in the interface of the media player that includes multiple different reasons for justifying censoring the first portion of the first media; and
wherein when receiving the second input from the user that includes the reason that justifies censoring the first portion of the first media, the processing unit is further configured to:
receive a selection of the reason from the multiple different reasons from the drop down menu in the interface of the media player.

6. The client device of claim 5, wherein the processing unit is further configured to:
receive, via the interface of the media player, a third input from the user that marks a second censoring start time and a second censoring stop time associated with a second portion of the first media that the user wishes to censor;
receive, via the interface of the media player, a fourth input from the user that includes a reason that justifies censoring the second portion of the first media, and
store the second start time and the second censoring stop time in association with data corresponding to the fourth input from the user in the cut profile for the first media.

7. The client device of claim 5, wherein the communication interface is further configured to receive streaming second media from the CDN, and
wherein the processing unit is further configured to:
execute the media player to play the streaming second media,
receive, via the interface of the media player, a first input from the user of the client device that marks a first censoring start time and a first censoring stop time associated with a first portion of the second media that the user wishes to censor, receive, via the interface of the media player, a second input from the user that includes a reason that justifies censoring the first portion of the second media, store the first censoring start time and the first censoring stop time in association with data corresponding to the second input from the user in a cut profile for the second media, and send, via the communication interface, the cut profile for the second media to the content management server in the CDN.

8. The client device of claim 7, wherein the processing unit is further configured to:

receive, via the interface of the media player, a third input from the user that marks a second censoring start time and a second censoring stop time associated with a second portion of the second media that the user wishes to censor;

receive, via the interface of the media player, a fourth input from the user that includes a reason that justifies censoring the second portion of the second media, and store the second start time and the second censoring stop time in association with data corresponding to the fourth input from the user in the cut profile for the second media.

9. A tangible, non-transitory computer-readable medium storing instructions executable by at least one processing unit, the computer-readable medium comprising:

one or more instructions for receiving streaming first media from a content delivery network (CDN) via a media delivery service;

one or more instructions for executing a media player to play the streaming first media, one or more instructions for receiving, via an interface of the media player, a first input from a user that marks a first censoring start time and a first censoring stop time associated with a first portion of the first media, wherein the user is a member of a user group of the media delivery service and belongs to a first media genre subgroup of the user group and a second media genre subgroup of the user group;

one or more instructions for presenting a drop down menu in the interface of the media player that includes multiple different reasons for justifying censoring the first portion of the first media;

one or more instructions for receiving a second input from the user that includes a selection of a reason that justifies censoring the first portion of the first media from the multiple different reasons from the drop down menu in the interface of the media player;

one or more instructions for storing, in a cut profile for the first media:
    an identifier associated with the first media,
    an identifier associated with the user,
    an identifier associated with the first media genre subgroup, and
    the first censoring start time and the first censoring stop time in association with data corresponding to the second input from the user; and one or more instructions for sending the cut profile for the first media to a content management server in the CDN to be available to each member of the user group via the media delivery service, and for publication only to a plurality of user devices associated with members of the user group that belong to the first media genre subgroup of users, wherein the content management server prevents access to the first media by members of the user group that belong to an age subgroup of users.

10. The tangible, non-transitory computer-readable medium of claim 9, further comprising:

one or more instructions for receiving, via the interface of the media player, a third input from the user that marks a second censoring start time and a second censoring stop time associated with a second portion of the first media that the user wishes to censor;

one or more instructions for presenting the drop down menu in the interface of the media player that includes multiple different reasons for justifying censoring the second portion of the first media;

one or more instructions for receiving a fourth input from the user that includes a selection of a reason that justifies censoring the second portion of the first media from the multiple different reasons from the drop down menu in the interface of the media player; and one or more instructions for storing the second start time and the second censoring stop time in association with data corresponding to the fourth input from the user in the cut profile for the first media.

11. The tangible, non-transitory computer-readable medium of claim 9, further comprising:

one or more instructions for receiving streaming second media from the CDN;

one or more instructions for executing the media player to play the streaming second media;

one or more instructions for receiving, via the interface of the media player, a first input from the user of the client device that marks a first censoring start time and a first censoring stop time associated with a first portion of the second media that the user wishes to censor, one or more instructions for presenting the drop down menu in the interface of the media player that includes multiple different reasons for justifying censoring the first portion of the second media;

one or more instructions for receiving a second input from the user that includes a selection of a reason that justifies censoring the first portion of the second media from the multiple different reasons from the drop down menu in the interface of the media player; and one or more instructions for storing the first censoring start time and the first censoring stop time in association with data corresponding to the second input from the user in a cut profile for the second media.

12. The tangible, non-transitory computer-readable medium of claim 11, further comprising:

one or more instructions for causing the cut profile for the second media to be sent to the content management server in the CDN.

13. The tangible, non-transitory computer-readable medium of claim 12, further comprising:

one or more instructions for receiving, via the interface of the media player, a third input from the user that marks a second censoring start time and a second censoring stop time associated with a second portion of the second media that the user wishes to censor;

one or more instructions for receiving a fourth input from the user that includes a selection of a reason that justifies censoring the second portion of the second media from the multiple different reasons from the drop down menu in the interface of the media player;

one or more instructions for storing the second censoring start time and the second censoring stop time in association with data corresponding to the fourth input from the user in a cut profile for the second media.

14. The method of claim 1, wherein streaming the first censored media comprises streaming the first censored media to a first requesting client device associated with a member of the user group who belongs to the second media genre subgroup.

15. The method of claim 1, wherein streaming the first censored media comprises streaming the first censored media to a first requesting client device associated with a member of the user group who belongs to the age subgroup of users.

16. The client device of claim 5, wherein the age subgroup of users comprises the members of the user group who are under an age corresponding to a Motion Picture Association of America (MPAA) rating of "R".

17. The client device of claim 5, wherein the age subgroup of users comprises the members of the user group who are under an age corresponding to a Motion Picture Association of America (MPAA) rating of "PG-13".

18. The tangible, non-transitory computer-readable medium of claim 9, wherein the age subgroup of users comprises the members of the user group who are under an age corresponding to a Motion Picture Association of America (MPAA) rating of "R".

19. The tangible, non-transitory computer-readable medium of claim 9, wherein the age subgroup of users comprises the members of the user group who are under an age corresponding to a Motion Picture Association of America SMPAA) rating of "PG-13".

\* \* \* \* \*